US011878331B2

(12) United States Patent
Filshill et al.

(10) Patent No.: US 11,878,331 B2
(45) Date of Patent: *Jan. 23, 2024

(54) METHODS AND SYSTEMS FOR LANDFILL THERMAL INSULATION

(71) Applicant: Aero Aggregates of North America LLC, Eddystone, PA (US)

(72) Inventors: Archibald Stewart Filshill, Huntingdon Valley, PA (US); Thomas Liam McGrath, Eddystone, PA (US)

(73) Assignee: Aero Aggregates of North America, LLC, Eddystone, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,707

(22) Filed: Aug. 31, 2021

(65) Prior Publication Data

US 2021/0394242 A1    Dec. 23, 2021

Related U.S. Application Data

(63) Continuation of application No. 16/754,631, filed as application No. PCT/US2018/054969 on Oct. 9, 2018, now Pat. No. 11,123,776.

(60) Provisional application No. 62/569,739, filed on Oct. 9, 2017.

(51) Int. Cl.
*B09B 1/00* (2006.01)
*C03C 11/00* (2006.01)
*C03C 1/00* (2006.01)
*E02D 31/00* (2006.01)

(52) U.S. Cl.
CPC ............ B09B 1/004 (2013.01); C03C 11/007 (2013.01); B09B 1/006 (2013.01); C03C 1/002 (2013.01); E02D 31/00 (2013.01); E02D 31/006 (2013.01); E02D 2300/0004 (2013.01); E02D 2300/0046 (2013.01); E02D 2300/0079 (2013.01)

(58) Field of Classification Search
CPC ....... B09B 1/004; C03C 1/002; E02D 31/006; E02D 2300/079; E02D 2300/0046; E02D 2300/0004
See application file for complete search history.

(56) References Cited

U.S. PATENT DOCUMENTS

| 2,691,249 A | 10/1954 | Ford et al. |
| 4,696,599 A | 9/1987 | Rakoczynski et al. |
| 5,090,843 A | 2/1992 | Grigsby et al. |
| 5,447,389 A | 9/1995 | Olson et al. |

(Continued)

FOREIGN PATENT DOCUMENTS

| EP | 2363535 A1 | 9/2011 |
| GB | 2294856 A | 5/1996 |
| JP | 2002224636 A * | 8/2002 |

OTHER PUBLICATIONS

Magwood, "Endeavour Innovative Learning, Building & Living", Aug. 9, 2012, pp. 1-2.

(Continued)

*Primary Examiner* — Janine M Kreck
(74) *Attorney, Agent, or Firm* — Stradley Ronon Stevens & Young, LLP

(57) ABSTRACT

Systems and methods are disclosed for landfill systems, comprising waste, a geosynthetic product, and a layer of foam glass aggregates interposed between the waste and the geosynthetic product.

20 Claims, 4 Drawing Sheets

(56) References Cited

U.S. PATENT DOCUMENTS

| | | | |
|---|---|---|---|
| 5,516,351 | A | 5/1996 | Solomon et al. |
| 5,857,807 | A | 1/1999 | Longo et al. |
| 11,123,776 | B2 * | 9/2021 | Filshill .................... B09B 1/00 |
| 2005/0126441 | A1 | 6/2005 | Skelhorn et al. |
| 2006/0002764 | A1 | 1/2006 | Legge et al. |
| 2006/0029473 | A1 | 2/2006 | Khire et al. |
| 2009/0269140 | A1 | 10/2009 | Hater et al. |
| 2013/0272795 | A1 | 10/2013 | Hull et al. |
| 2015/0136354 | A1 | 5/2015 | Yesiller et al. |
| 2016/0264446 | A1 | 9/2016 | Youssefi et al. |

OTHER PUBLICATIONS

Ozel, et al., "Utilization of Natural Zeolite and Perlite as Landfill Liners for in Situ Leachate Treatment in Landfills", 2012, pp. 1581-1592.

Perlite, "Perlite Products for Every Application", Sep. 2020, pp. 1-13.

Perlite Institute, Inc., "Physical Characteristics of Perlite", 2011, 1 page.

* cited by examiner

METHODS AND SYSTEMS FOR LANDFILL THERMAL INSULATION

CROSS-REFERENCE TO RELATED APPLICATIONS

This application is a continuation of U.S. Ser. No. 16/754,631 (now U.S. Pat. No. 11,123,776), which is the National Stage Entry under 35 U.S.C. § 371 of Patent Cooperation Treaty Application No. PCT/US2018/054969, which claims the benefit of U.S. Provisional application Ser. No. 62/569,739, filed Oct. 9, 2017, the entire contents of each of which are incorporated by reference herein.

BACKGROUND

Waste landfill applications typically incorporate geosynthetic products (e.g., barrier layers, gas collection layers, etc.). However, heat produced by the biodegradation of the waste can have deleterious effects on these geosynthetic products.

Thus, what is needed are improved insulation systems and methods for geosynthetic products in landfill applications.

SUMMARY

Systems and methods are disclosed for landfill systems, comprising waste, a geosynthetic product, and a layer of foam glass aggregates interposed between the waste and the geosynthetic product.

DETAILED DESCRIPTION

Figure 1:
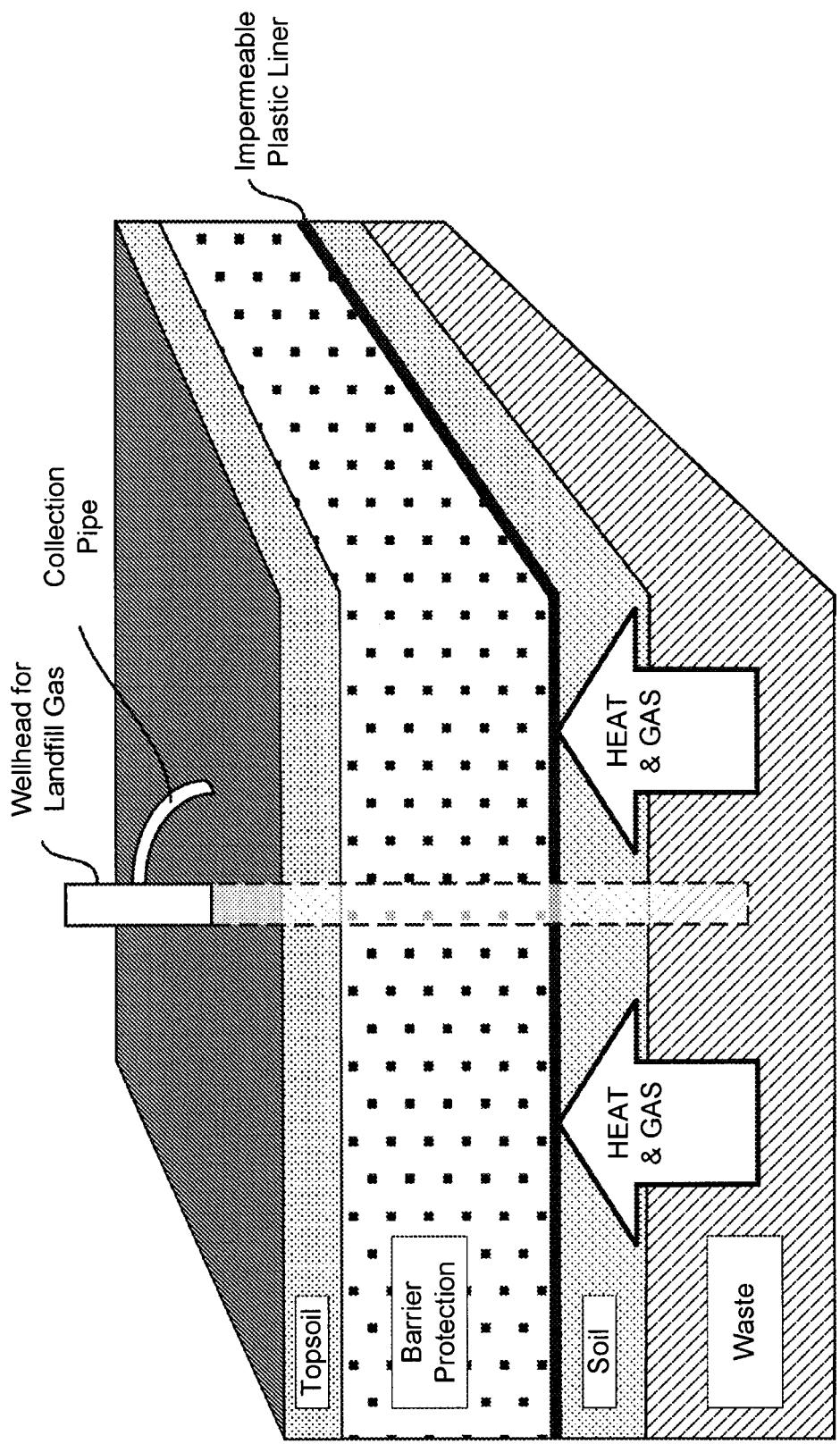
FIG. 1 depicts a landfill cap.

FIG. 1 depicts a landfill cap. Waste is covered by a soil barrier or cover layer.

A geosynthetic product, such as an impermeable plastic liner (e.g., reinforced polyethylene (e.g., high-density polyethylene (HDPE), linear low-density polyethylene (LLDPE) or other cover (e.g., reinforced polypropylene, thermoplastic olefin, ethylene propylene diene monomer, polyvinyl chloride, isobutylene isoprene, butyl rubber, etc.). The impermeable plastic liner acts to trap gas evolved from the biodegradation of the waste.

A wellhead collects the landfill gas, which is transported from a collection pipe to a series of lateral pipes (not depicted).

A layer of barrier protection material covers the impermeable plastic liner, for example, to prevent frost damage or mechanical puncture. Topsoil covers the barrier protection layer.

Both gas and heat are evolved from the biodegradation of the waste. In some instances, the heat can have deleterious effects on the geosynthetic products, including degradation and/or failure. This is disadvantageous for many reasons, and may require the entire system to be replaced. Remediation costs may exceed original installation costs.

Figure 2:
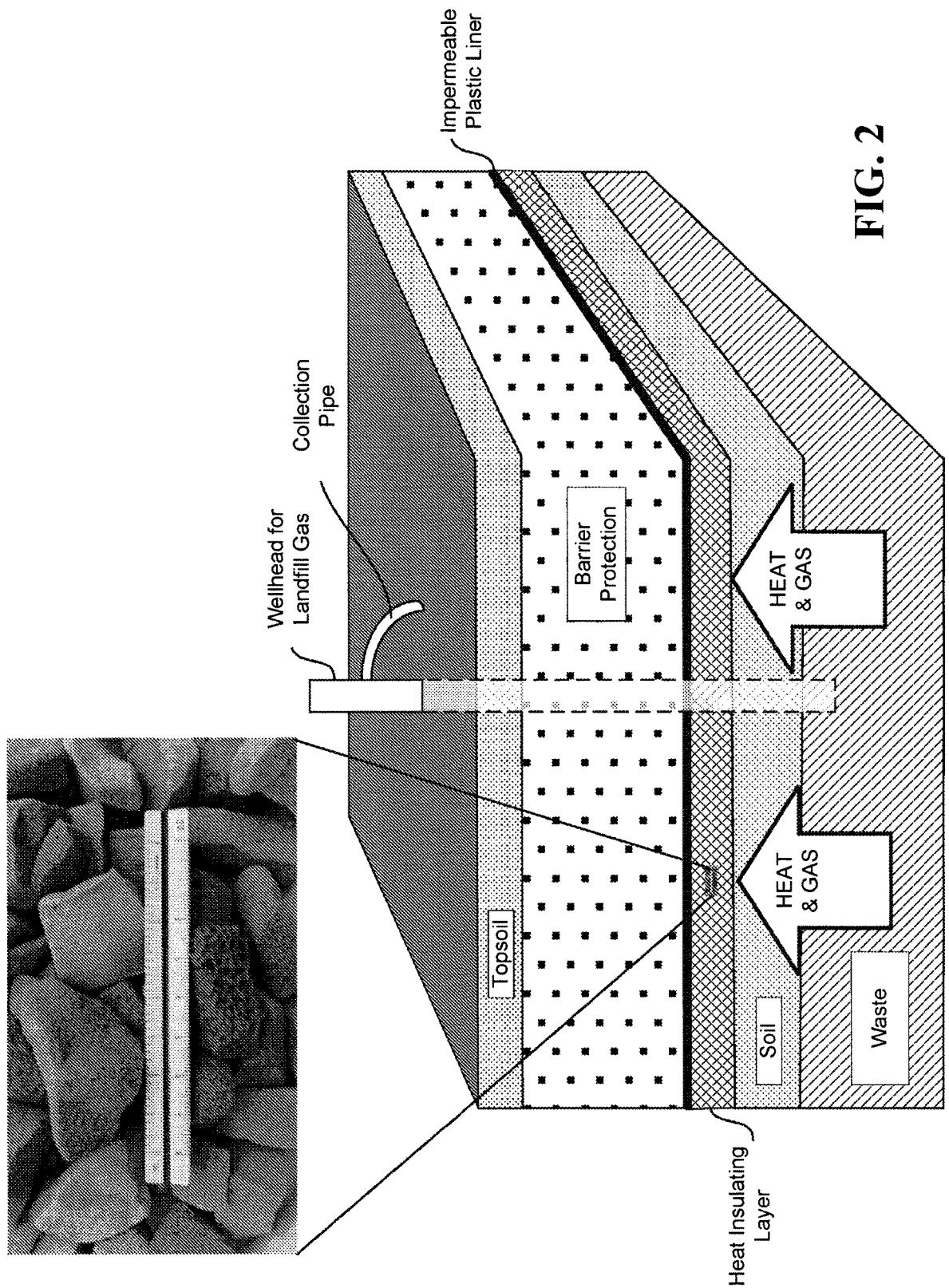
FIG. 2 depicts a landfill cap comprising a layer of foam glass aggregates, such as lightweight-foamed glass aggregates.

FIG. 2 depicts a landfill cap having features as described with respect to FIG. 1, but further comprising a layer of foam glass aggregates, such as lightweight-foamed glass aggregates. A layer of lightweight-foamed glass aggregates may be interposed between the soil barrier and the impermeable plastic liner.

Lightweight-foamed glass aggregate is an inert, stable, and environmentally friendly substrate. Typically, to form lightweight-foamed glass aggregates, recycled glass is cleaned, ground, mixed with a foaming agent, heated, and allowed to fragment from temperature shock. The resulting aggregate is cellular, with a relatively low bulk density, but relatively high durability. Lightweight-foamed glass aggregate has many uses, for example, as a lightweight fill for construction applications, vehicle arrestor beds, building insulation, etc. However, since lightweight-foamed glass aggregates provides an important economic driver for glass recycling, finding new uses and applications for lightweight-foamed glass aggregates is extremely desirable. Lightweight-foamed glass aggregates are chemically inert. Moreover, lightweight-foamed glass aggregates are extremely stable, do not degrade, and are temperature stable to 800° C. A layer of lightweight-foamed glass aggregates may provide significant heat insulation for the impermeable plastic liner.

The layer of lightweight-foamed glass aggregates may be from about six inches to about three feet thick. The layer of lightweight-foamed glass aggregates may be from about twelve inches to about twenty-four inches thick.

Suitable lightweight-foamed glass aggregates may be procured from AERO AGGREGATES OF NORTH AMERICA LLC, Eddystone, PA, for example, under the tradename UL-FGA foamed glass aggregates. The lightweight-foamed glass aggregates may be prepared from a recycled glass cullet. The lightweight-foamed glass aggregates may be prepared from a sodo-calic glass. As lightweight-foamed glass aggregates are made up of silica, they may be considered a natural material for regulatory purposes. As lightweight-foamed glass aggregates are made from recycled glass, they may be considered environmentally friendly. Lightweight-foamed glass aggregate properties include low unit weight, low thermal conductivity, and high strength. They are also non-absorbent, non-toxic, non-leachable, chemically stable, impervious to UV degradation, freeze/thaw stable, and fireproof.

The lightweight-foamed glass aggregates may be prepared from recycled glass cullet that contains less than 1% borosilicate glass.

The lightweight-foamed glass aggregates may have a particle size of about 5 mm to about 80 mm. The lightweight-foamed glass aggregates may have a particle size of about 10 mm to about 60 mm. The lightweight-foamed glass aggregates may have a bulk density of about 120 kg/m$^3$ to about 400 kg/m$^3$. The lightweight-foamed glass aggregates may have a bulk density of about 200 kg/m$^3$ to about 240 kg/m$^3$.

Figure 3:
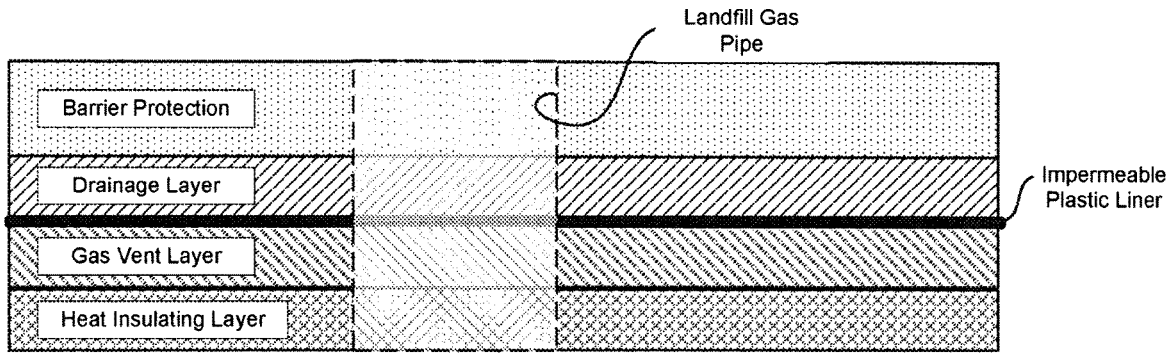
FIG. 3 depicts a schematic of selected layers of a landfill cap incorporating lightweight-foamed glass aggregates.

Turning to FIG. 3, the impermeable plastic liner may have a series of adjacent layers. A drainage layer may be interposed between the barrier protection layer and the impermeable plastic liner to provide drainage. A gas vent layer may be disposed under the impermeable plastic liner to facilitate gas collection. The heat insulating layer (e.g., of lightweight-foamed glass aggregates) may be used to protect the impermeable plastic liner and gas vent layer (and its associated piping and components) from excessive heat from the waste.

Figure 4:
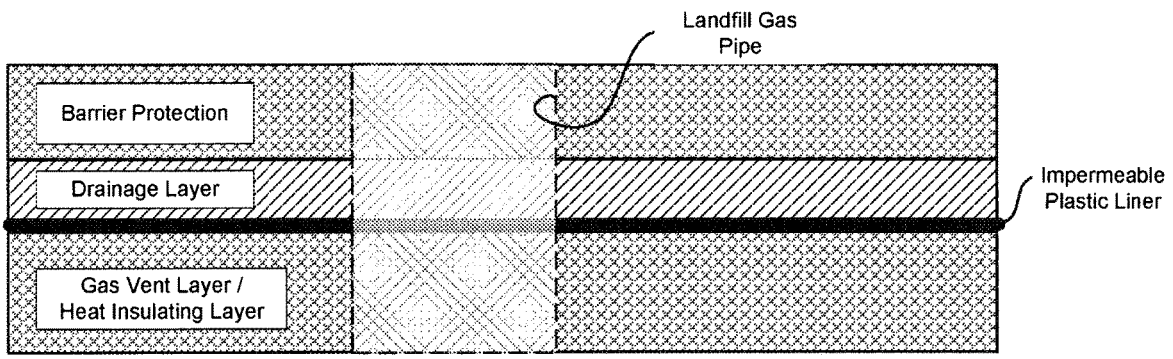
FIG. 4 depicts a schematic of selected layers of a landfill cap incorporating lightweight-foamed glass aggregates.

Turning to FIG. 4, the impermeable plastic liner may have a series of adjacent layers. A drainage layer may be interposed between the barrier protection layer and the impermeable plastic liner to provide drainage. A layer of lightweight-foamed glass aggregates may be disposed under (e.g., directly under) the impermeable plastic liner. The layer of lightweight-foamed glass aggregates may act as both a gas vent layer to facilitate gas collection and a heat insulating layer to protect the impermeable plastic liner and associated piping and components from excessive heat from the waste. Lightweight-foamed glass aggregates may exhibit a high flow rate for gas collection.

Figure 5:
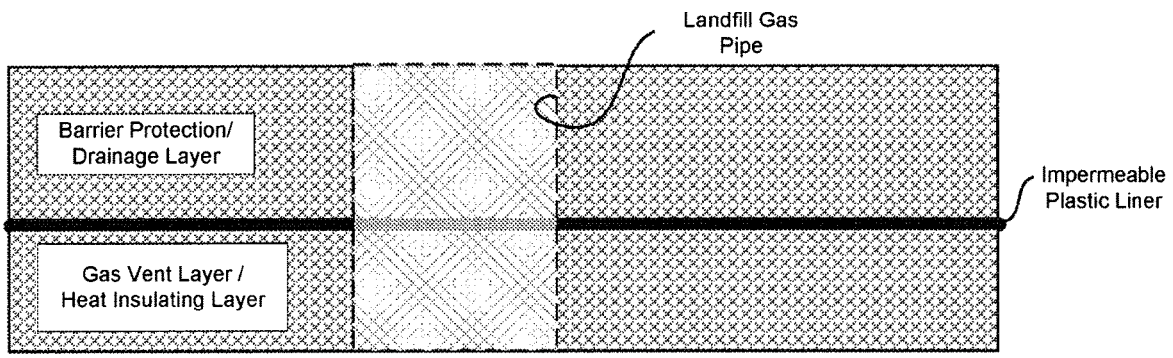
FIG. 5 depicts a schematic of selected layers of a landfill cap incorporating lightweight-foamed glass aggregates.

Turning to FIG. 5, the impermeable plastic liner may have a series of adjacent layers. A first layer of lightweight-foamed glass aggregates may be placed above the impermeable plastic liner to provide drainage. Lightweight-foamed glass aggregates are permeable to water and do not compact, allowing water to pass through the layer of lightweight-foamed glass aggregates. A layer of lightweight-foamed glass aggregates may be used as a barrier protection layer in a landfill cap. Lightweight-foamed glass aggregates exhibit exceptional long-term durability. Lightweight-foamed glass aggregates are inert and do not degrade. Moreover, lightweight-foamed glass aggregates have a low unit weight, thereby reducing settlement within the waste.

Additionally, lightweight-foamed glass aggregates provides frost protection. Accordingly, a barrier protection layer containing lightweight-foamed glass aggregates has the advantage of reducing the amount of topsoil required (e.g., as a cover layer) in colder regions (e.g., those with relatively deeper frost depth levels).

A second layer of lightweight-foamed glass aggregates may be disposed under (e.g., directly under) the impermeable plastic liner. The second layer of lightweight-foamed glass aggregates may act as both a gas vent layer to facilitate gas collection and a heat insulating layer to protect the impermeable plastic liner and associated piping and components from excessive heat from the waste.

Figure 6:
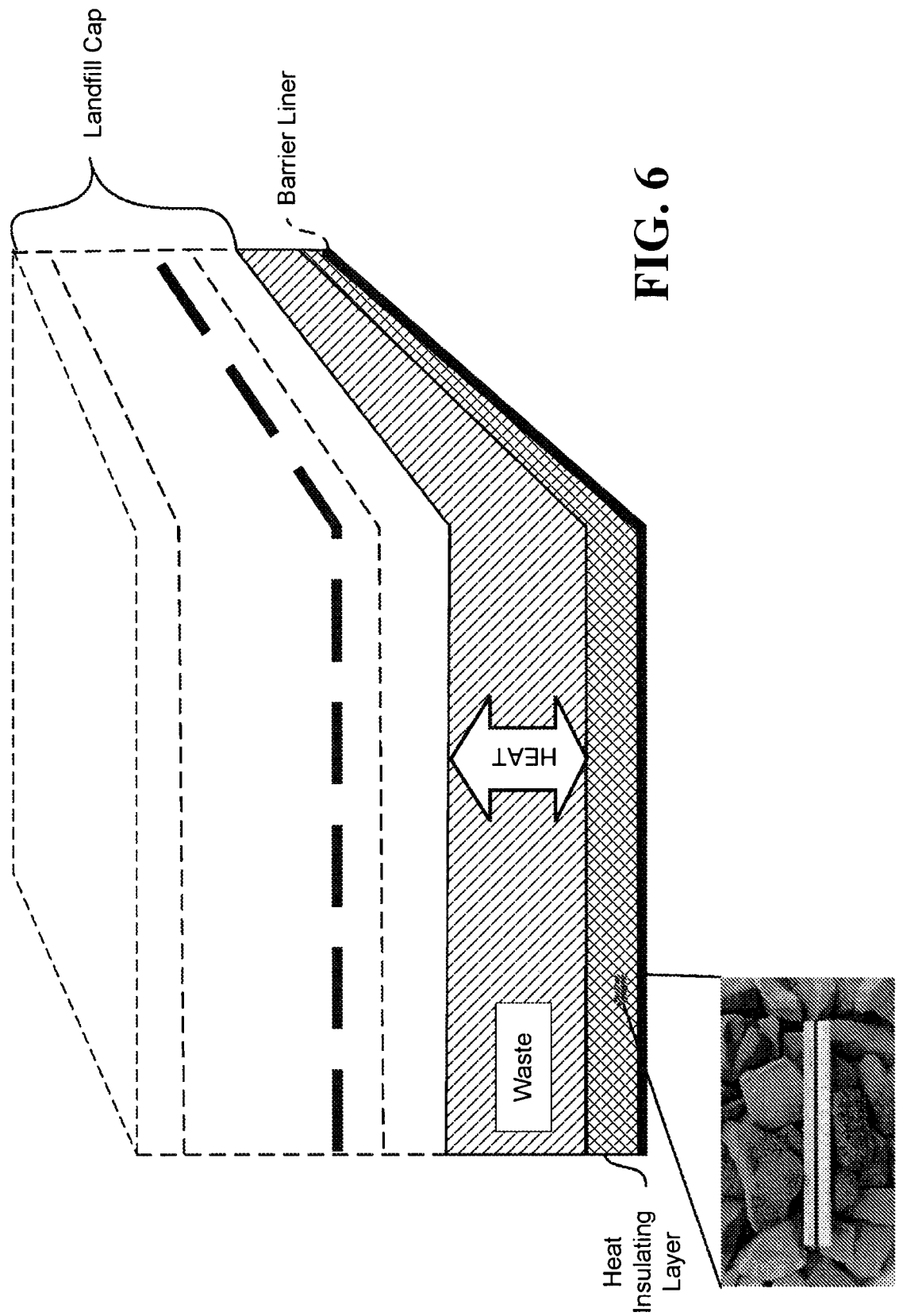
FIG. 6 depicts a landfill barrier liner thermally insulated from waste by a layer of lightweight-foamed glass aggregates.

Turning to FIG. 6, a landfill may have a barrier liner (for example, to prevent leachate from reaching groundwater, for compliance with government regulation, etc.). A layer of lightweight-foamed glass aggregates may be placed above the barrier liner, interposed between the waste and the barrier liner. The lightweight-foamed glass aggregates may be used in conjunction with leachate lines (e.g., a leachate collection system), providing a lightweight, draining, fill. The lightweight-foamed glass aggregates may provide thermal insulation for the barrier liner from the waste. The layer of lightweight-foamed glass aggregates may be from about six inches to about twenty-four inches thick. The layer of lightweight-foamed glass aggregates may be about twelve inches thick.

A landfill cap (depicted in dashed lines) may be placed above the waste. The landfill cap, in one example, may be one described herein. Waste may be thermally insulated by two layers of lightweight-foamed glass aggregates, e.g., a layer of lightweight-foamed glass aggregates above the waste (e.g., thermally insulating the gas collection liner), and a layer of lightweight-foamed glass aggregates below the waste (e.g., thermally insulating the barrier liner).

lightweight-foamed glass aggregates may also be combined with water treatment media (such as, for example steel slag, calcium carbonates, etc.) that removes phosphates and nitrates.

EXAMPLES

Example 1

Recycled glass cullet is cleaned, ground to less than 150 micrometers (US Standard sieve size No. 100), mixed with a foaming agent (e.g., a carbonate foaming agent) in a pug mill, heated, and allowed to fragment from temperature shock. The resulting lightweight-foamed glass aggregates are cellular. After sample preparation, the initial moisture content is measured following ASTM D2216 (2010), grain size distributions are determined following ASTM C136/136M (2006) and the initial bulk density is measured following ASTM C127 (2012a) on the lightweight-foamed glass aggregates. The average moisture content is determined to be 1.06% and the average bulk density is determined to be 227.2 kg/m3 (14.2 pcf). Sieve analyses are performed following the dry sieving method on the lightweight-foamed glass aggregates. Particle size ranges from 10 to 30 mm (0.39 to 1.18 in) but is a very uniformly graded material.

Example 2

Recycled glass cullet is cleaned, ground, mixed with a foaming agent, heated, and allowed to fragment from temperature shock. The resulting lightweight-foamed glass aggregates are cellular (foaming creates a thin wall of glass around each gas bubble). By volume, lightweight-foamed glass aggregates are approximately 92% gas bubbles and 8% glass. The water content (per ASTM D 2216) of lightweight-foamed glass aggregates is about 2%.

The invention claimed is:

1. A method, comprising:
    placing, in a landfill, a geosynthetic product, a layer of waste, and, interposed between the waste layer and the geosynthetic product, a layer of foam glass aggregates, wherein the layer of foam glass aggregates is disposed below the geosynthetic product and prevents the waste from contacting the geosynthetic product, and
    wherein the foam glass aggregates are chemically inert and temperature stable.

2. The method of claim 1, wherein the layer of foam glass aggregates provides heat insulation for the geosynthetic product from the waste layer.

3. The method of claim 1, wherein the layer of foam glass aggregates is about six inches to about thirty-six inches thick.

4. The method of claim 1, wherein the foam glass aggregates have a particle size of about 5 mm to about 80 mm.

5. The method of claim 1, wherein the foam glass aggregates have a bulk density of about 120 kg/m$^3$ to about 400 kg/m$^3$.

6. The method of claim 1, wherein the foam glass aggregates are prepared from a recycled glass cullet.

7. A method, comprising:
    placing, in a landfill, a geosynthetic product, a layer of waste, and, interposed between the waste layer and the geosynthetic product, a layer of foam glass aggregates, wherein the layer of foam glass aggregates comprises a gas vent layer disposed below the geosynthetic product, and wherein the foam glass aggregates are chemically inert and temperature stable.

8. The method of claim 7, wherein the geosynthetic product is an impermeable plastic liner.

9. The method of claim 8, wherein the layer of foam glass aggregates acts as a gas vent layer to facilitate gas collection and a heat insulating layer to protect the impermeable plastic liner from excessive heat from the waste.

10. The method of claim 7, wherein the layer of foam glass aggregates exhibits a high flow rate for gas passing through the layer for gas collection.

11. The method of claim 7, wherein the foam glass aggregates have a particle size of about 5 mm to about 80 mm and the layer of foam glass aggregates is about six inches to about thirty-six inches thick.

12. A landfill system, comprising:
    waste;
    a geosynthetic product; and
    a layer of foam glass aggregates disposed above the waste and interposed between the waste and the geosynthetic product, wherein the layer of foam glass aggregates prevents the waste from contacting the geosynthetic product and acts as a heat insulating layer to protect the geosynthetic product from heat from the waste.

13. The landfill system of claim 12, wherein the layer of foam glass aggregates is about six inches to about thirty-six inches thick.

14. The landfill system of claim 12, wherein the foam glass aggregates have a particle size of about 5 mm to about 80 mm.

15. The landfill system of claim 12, wherein the foam glass aggregates are prepared from a recycled glass cullet.

16. The landfill system of claim 12, further comprising piping passing through the layer of foam glass aggregates.

17. The landfill system of claim 16, wherein the piping is gas collection piping.

18. The landfill system of claim 16, wherein the geosynthetic product is an impermeable plastic liner.

19. The landfill system of claim 12, further comprising a second layer of foam glass aggregates disposed below the waste and a second geosynthetic product disposed below the second layer of foam glass aggregates, wherein the second layer of lightweight-foamed glass aggregates allows leachate to pass from the waste through the second layer of lightweight-foamed glass aggregates, and wherein the second geosynthetic product is a barrier liner to prevent leachate from reaching groundwater below the landfill.

20. The landfill system of claim 12, further comprising a second layer of foam glass aggregates disposed above the geosynthetic product as part of a barrier protection layer.

* * * * *